United States Patent [19]

Hess

[11] Patent Number: 5,060,984

[45] Date of Patent: Oct. 29, 1991

[54] SHORT RADIUS, LOW WEAR ELBOW

[75] Inventor: Larry W. Hess, Harrisburg, Pa.

[73] Assignee: HammerTek Corporation, Landisville, Pa.

[21] Appl. No.: 644,247

[22] Filed: Jan. 22, 1991

[51] Int. Cl.$^5$ ............................................. F16L 43/00
[52] U.S. Cl. .................................... 285/127; 285/179; 406/193; 137/599
[58] Field of Search ............... 285/179, 127, 183, 153; 406/191, 192, 193, 194, 195, 174; 137/599

[56] References Cited

U.S. PATENT DOCUMENTS 4,387,914 6/1983 Paulson et al. ................. 285/179 X

FOREIGN PATENT DOCUMENTS

| 178206 | 2/1966 | U.S.S.R. | 406/191 |
| 650908 | 3/1979 | U.S.S.R. | 406/193 |
| 1206213 | 1/1986 | U.S.S.R. | 406/193 |

Primary Examiner—Dave W. Arola
Assistant Examiner—Heather Chun
Attorney, Agent, or Firm—Russell J. Egan

[57] ABSTRACT

A long lasting elbow allowing sharp turns in particulate material handling systems without having undue wear of the elbow is formed with a chamber aligned with but axially offset from the entry port of the elbow. The effect of this chamber is to provide a rotating mass of the conveyed material against which the subsequent material impinges and is directed through the elbow without undue loss of velocity. A vent conduit connects the chamber to the elbow channel to allow purging to the chamber through a venturi action.

13 Claims, 2 Drawing Sheets

SHORT RADIUS, LOW WEAR ELBOW

BACKGROUND OF THE INVENTION

1. Field of the Invention

The present invention relates to an improved short radius, low wear elbow and in particular to an elbow which has superior operating characteristics under low speed, dense conveying circumstances.

2. The Prior Art

The present invention represents an improvement in the short radius, low wear elbow described in my U.S. Pat. No. 4,387,914.

There has been a problem involved in the handling of fluent materials, such as granular or particulate particles, in making changes in direction of the flow of the fluent material. Heretofore, it has been necessary to make a turn, such as a right angle turn, in a long sweeping curve rather than a sharp turn. Generally this curve had a radius which was approximately ten times the diameter of the pipe. This long curve was necessitated by the fact that particulate material impinging upon the walls of a sharp angled turn would strike a target area directly opposite the entry port and rapidly erode the wall in this area. There were many attempts to solve this problem amongst which were the inclusion of inserts into the turn forming joint, the insert being disposable item intended to wear out. Examples of this type of elbow can be found in U.S. Pat. Nos. 1,357,259; 2,911,235; and 3,942,684.

Other attempts have been made to design an elbow configuration to accommodate the flow of fluent material through a sharp angled turn. The most interesting of these can be found in U.S. Pat. No. 2,801,133 which shows an angled nozzle having a chamber with an extension forming a pocket in axial alignment with the inlet opening. When material is blown through this nozzle, a certain quantity of material will fill the pocket and serve as a pad for the subsequently blown material. Thus, the pad of material that is formed serves as a wear surface, as in the case of the above mentioned patents.

My prior invention pertains to a short radius, low wear elbow capable of making sharp turns in fluent material handling lines without suffering from detrimental erosion characteristics of the prior art. The elbow is formed of rigid material having entrance and exit ports lying normal to each other and in close proximity, each port being surrounded by a face plate. A channel extends between the face plates making a short sharp angled turn. A cavity is formed extending from the outer tangent of the turn opposite the entrance port with the axis of the cavity lying to the outside of the axis of the entry port. The cavity joins the channel at a point one quarter of the channel diameter above the axis of the channel. Material passing through the elbow from the entrance to the exit enters the cavity in a swirling motion with the material constantly being renewed, passed on, and absorbing the blows of the subsequent material without suffering the erosive effect thereof.

SUMMARY OF THE INVENTION

The present invention constitutes an improvement over my earlier elbow by providing an elbow which will be effective in low speed dense phase operation to both protect the product from harmful breakage while providing complete self cleaning at the end of a run so that sequentially conveyed materials will not become mixed together, a particular consideration when colored materials are being conveyed and color contamination would be especially detrimental.

The subject elbow is formed of rigid material having entrance and exit ports extending substantially normal to each other in close proximity. A channel extends between the ports making a short radius sharp angle turn. A cavity is formed extending from the outer tangent of the turn opposite the entry port with the axis of the cavity lying to the outside of the axis of the entry port. The cavity joins the channel at a point one quarter of the channel diameter above the axis of the channel. A vent conduit connects a rear portion of the cavity to the channel at a point above the cavity opening into the channel. The vent is tapered in section to form a truncated cone with the larger end in the channel. The vent may also be provided with a valve or gate to close it off. Material passing through the elbow from the entrance port to the exit port will enter the cavity forming a swirling mass in which the material is constantly being renewed, passed on, and absorbing the blows of the subsequent material without suffering the erosive effects thereof.

According to one aspect of the invention, the subject elbow will enable low radius sharp turns in fluent material handling systems without the previous erosion or clogging.

According to another aspect of the present invention, the subject elbow can operate at low speeds in dense operating phases without undesired dropping of velocity or breakage of the material being conveyed.

According to another aspect of the invention colored materials can be sequentially conveyed with confidence that the previous color will be completely cleaned from the system prior to the introduction of the subsequent color.

BRIEF DESCRIPTION OF THE DRAWINGS

An embodiment of the present invention will now be described by way of example with reference to the accompanying drawings in which.

DETAILED DESCRIPTION OF THE PREFERRED EMBODIMENT

Figure 1:
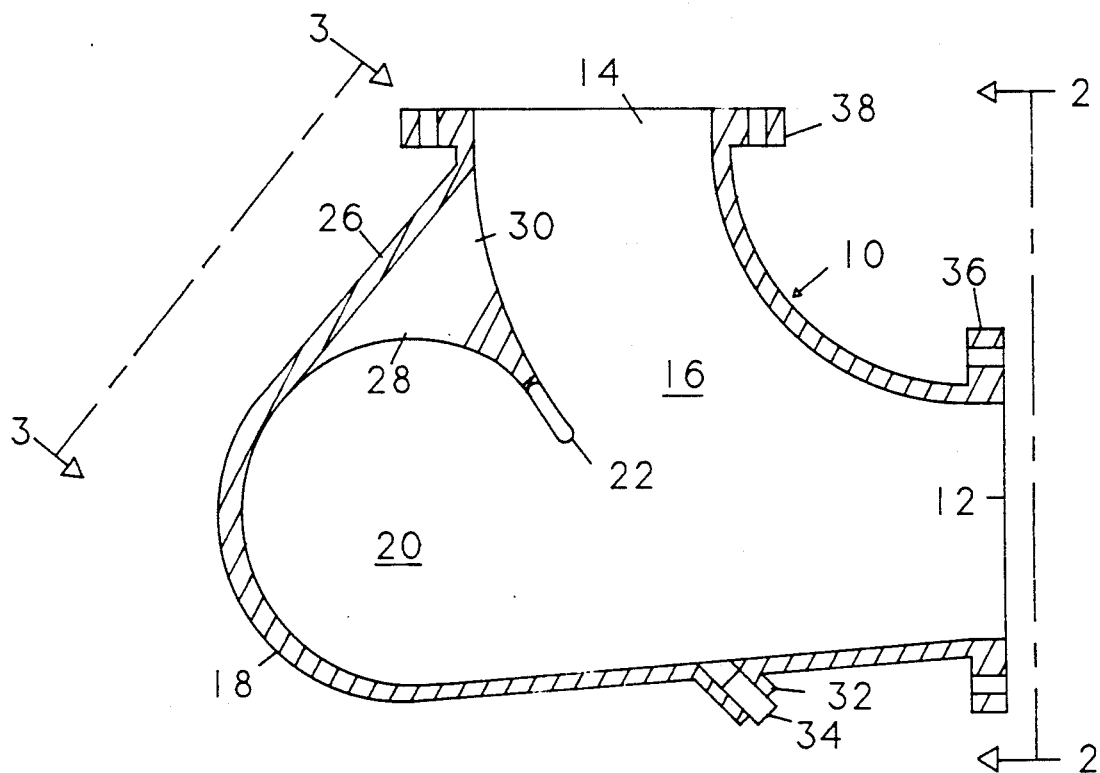
FIG. 1 is a vertical section through an elbow according to the present invention.

The subject elbow 10 has an entry port 12, and exit port 14, and a channel 16 extending therebetween. Opposite the entry port 12 there is an extension 18 forming a cavity 20 and a line of division 22 forming an annular opening 24 axially offset from the axis of the inlet port 12. The line of division 22 is at a point one quarter of the diameter from the axis of the entry port. A vent conduit 26 connects the cavity 20 at point 28 to the channel 16 at point 30. The vent conduit 26 is generally circular in section an is tapered from a smaller diameter at the cavity end to a larger diameter at the channel end. The elbow can be provided with an optional purge opening 32 which would normally be closed by a stopper 34. Both entry ports can be surrounded by mounting face flanges 36,38 in a conventional manner.

The subject invention differs from conventional elbows in both appearance and operation. The centrifugal force developed by particles going through a long radius or conventional elbow causes wear in a target zone by the abrasive movement of the particles. The intimate contact of the particles with the pipe walls also cause the particles to lose energy by friction. The high velocity impact of particles in the target zone can also cause fracturing of the product, if it is indeed fragile. The resulting reduced exit velocity can require the expenditure of extra energy to accelerate the material back to the desired conveying speed. Further, the long curved pipes require difficult piping layouts resulting in high installation costs and the requirement for usage of a great deal of space.

The theory of operation of the subject elbow is a self-forming target zone deflects particles towards the exit which eliminates wear of the elbow and loss of velocity from friction and centrifugal force. A continuously replenishing supply of material forms a slowly revolving vortice in the chamber providing a soft impact zone which prevents the breakage of fragile product. The deflected particles are quickly returned to the conveying velocity with the minimum loss of energy. The compact design also solves the above-mentioned pipe layout problems speeding both design and installation time while saving piping cost and space. The self cleaning effect of the constantly swirling product in the vortice causes a purging action to flush clean the chamber thereby preventing cross contamination with subsequently processed product. The subject elbow functions best when operated in a dense phase, that is on the opposite side of saltation from dilute phase, saltation velocity being the speed at which particles fall out of an air stream. In the dense phase there is the least product attrition, the lowest elbow wear and higher velocity resulting in higher energy saving per pound of product conveyed.

The present elbow gives improved low speed dense phase conveying. The vent conduit is circular in section and tapered for a venturi effect so product is pulled through from the cavity to the channel lessening frictional contact with the walls of the elbow. The wall of the elbow is reduced and replace by moving particles so that subsequent particles turning the bend of the elbow are mostly in product contact rather than in contact with a metal elbow wall. At velocities of less than 3800 ft/min and pressures lower than 6–15 psi less than pressure at dilute conveying velocity, the vent conduit is approximately half constricted. The angle of the vent conduit determines the speed of evacuation of the chamber, the harder the turn, the slower the evacuation. The present invention, with the vent conduit, allows for complete purging of the elbow at less than a full conveying rate, which is especially good when the color of the product is to be changed, as noted above.

Figure 4:
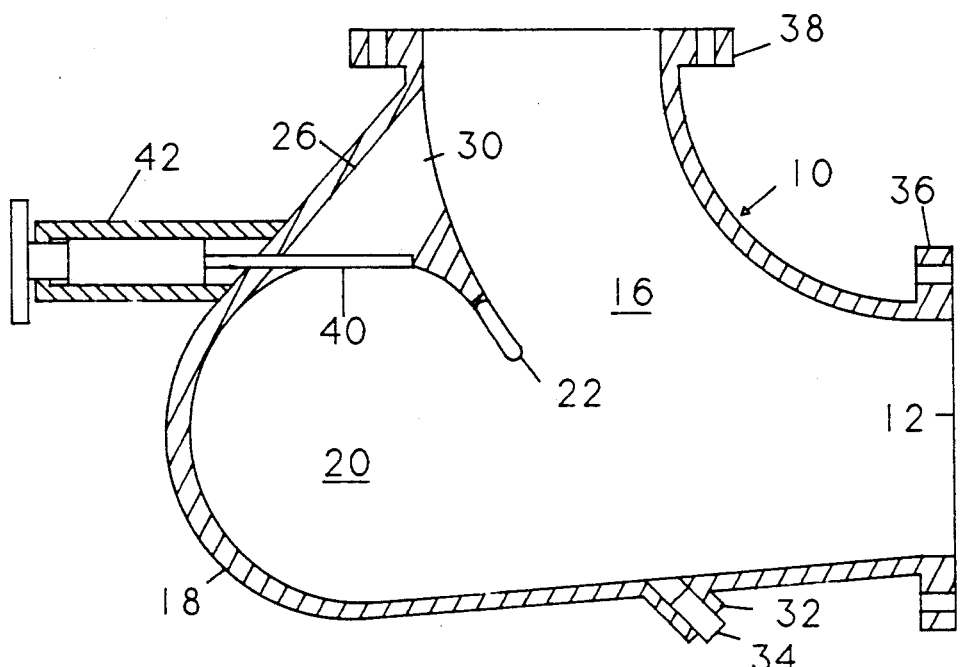
FIG. 4 is a vertical section through an alternate embodiment of the elbow according to the present invention.
Figure 2:
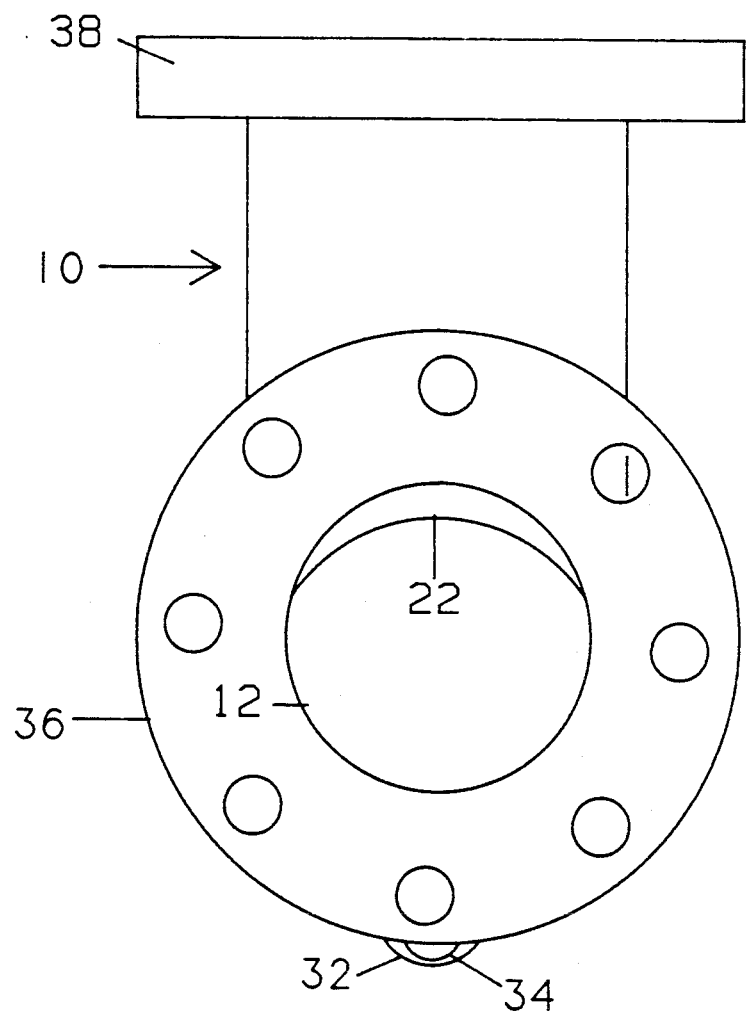
FIG. 2 is an end elevation taken along line 2—2 of FIG. 1.
Figure 3:
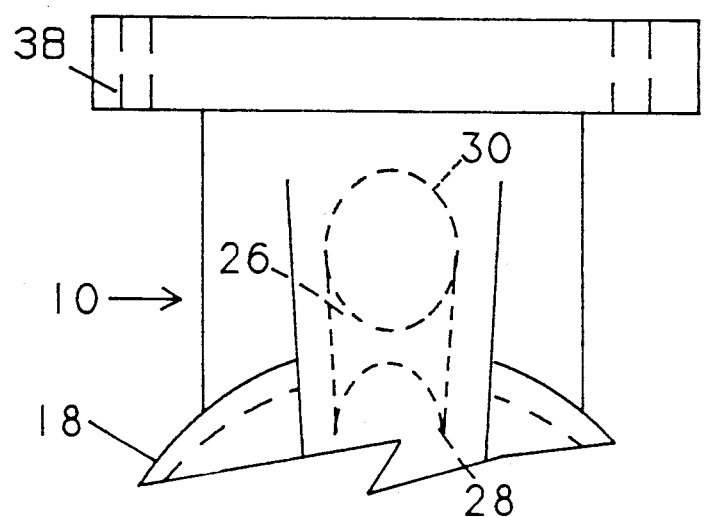
FIG. 3 is a partial elevation taken along the line 3—3 of FIG. 1.

As an alternate embodiment, and with reference to FIG. 4, the vent conduit could be provided with a knife gate 40 at one end thereby allowing the elbow to be used for conveying fluids and preventing water hammer. The knife gate 40 would be moved into and out of vent conduit 26 by any known means 42, here schematically shown as a screw thread assembly.

The subject elbow is preferably cast from known materials such as aluminum, cast iron, nie-hard, or stainless steel, although other materials can also be used. It is also within the preview of the invention to line the elbow with exotic ceramic or other linings. A light duty version of the subject elbow may be fabricated, but this is much more difficult to get the correct dimensions by such means. Finally, the subject elbow can be provided with any type of known mounting means on either or both ends in order to attach the elbow to the adjoining pipe.

While the primary use of the subject invention is in the transportation of particulate material, it also could be used in pollution control, for example in an abrasive dust handling system of the type which may be installed in a foundry.

The present embodiment is intended in all respects to be illustrative and not restrictive of the scope of the invention.

I claim:

1. In a fluent material handling system, and elbow means for effecting small radius turns without excessive wear, velocity reduction and particle breakage, said elbow means comprising:
   an annular entry port;
   an annular exit port;
   a continuous annular channel extending between said ports in an arc;
   a chamber formed on the outer wall on the outer arc of said channel opposite said entry port, said chamber opening into said channel on one side tangential to said channel wall with the other side of said chamber merging with said outer wall at a point outwardly offset parallel to the central axis of said inlet port by one quarter the diameter of said channel; and
   a vent conduit connecting a portion of said chamber adjacent said outer wall to said channel downstream from said merging point.

2. The invention according to claim 1 wherein said vent conduit is circular in cross section.

3. The invention according to claim 2 wherein said vent conduit is tapered to form a truncated cone with the larger end opening into said channel.

4. An elbow formed of rigid materials having an annular channel extending in a short radiused arc between an annular entry port and an annular exit port, characterized by a vortice chamber formed in the outer arcuate wall of said channel opposite said entry port, one side of said chamber being tangential to the outer edge of said channel and the opposite side merging with said outer wall forming a line of division within said channel, said line of division being outwardly axially offset from the central axis of said entry port by one quarter the diameter of said port, and a vent conduit connecting a portion of said chamber adjacent said outer wall to said channel down stream of said merge point whereby at least a portion of the material entering said elbow will swirl in a vortice configuration in said chamber deflecting following material along said channel without causing wear of said elbow, said material in said chamber reentering said channel without substantial loss of velocity and material from said chamber being pulled therefrom by the venturi effect of said vent conduit.

5. An elbow according to claim 4 cast from rigid materials.

6. An elbow according to claim 4 further comprising means adjacent said ports for securing said elbow to associated pipes.

7. An elbow according to claim 4 further comprising normally closed purge means leading to said chamber.

8. An elbow according to claim 4 further comprising valve means controlling the opening of said vent conduit.

9. An elbow according to claim 8 wherein said valve means is a knife gate.

10. An elbow according to claim 9 wherein said knife gate is located at the chamber end of said conduit.

11. An elbow according to claim 4 wherein said vent conduit is circular in cross section.

12. An elbow according to claim 4 wherein said vent conduit is a truncated cone with the larger end opening into said channel.

13. A method of effecting a short radiused turn in a fluent material handling system without undue erosion, loss of velocity or particle breakage, comprising the steps of:

providing an elbow having a conduit extending in a short radiused arc between an annular inlet port and an annular exit port with a vortice chamber opposite said inlet port, one wall of said chamber being tangential to the outer arcuate wall of said conduit and the opposite wall of said chamber merging with said outer wall at a point offset outwardly one quarter of the diameter of said annular entry port with respect to the central axis of said entry port forming a line of division between said elbow and said chamber, and a vent conduit connecting a portion of said chamber adjacent said outer wall to said channel downstream of said line of division;

passing fluent material through said elbow in a low speed dense phase condition;

allowing at least a portion of said material to enter said chamber where it will swirl in a vortice forming a constantly renewed rotating pad against which subsequent material rebounds along said elbow without substantial erosion of said elbow or loss of particle velocity or damage to said particles, at least some of said particles being drawn through said vent conduit, whereby the elbow will be completely cleaned out.

* * * * *